(12) United States Patent
Lindskog et al.

(10) Patent No.: US 6,570,527 B1
(45) Date of Patent: May 27, 2003

(54) CALIBRATION OF DIFFERENTIAL FREQUENCY-DEPENDENT CHARACTERISTICS OF A RADIO COMMUNICATIONS SYSTEM

(75) Inventors: Erik D. Lindskog, Sunnyvale, CA (US); Mitchell D. Trott, Mountain View, CA (US); Adam B. Kerr, Menlo Park, CA (US)

(73) Assignee: ArrayComm, Inc., San Jose, CA (US)

(*) Notice: Subject to any disclaimer, the term of this patent is extended or adjusted under 35 U.S.C. 154(b) by 0 days.

(21) Appl. No.: 09/967,258

(22) Filed: Sep. 28, 2001

(51) Int. Cl.[7] ................................................. G01S 7/40
(52) U.S. Cl. .................... 342/174; 342/42; 342/43; 342/165; 342/173
(58) Field of Search ............... 342/42–52, 57, 342/58, 165, 173, 174, 175, 195, 368–377; 370/315–325, 328, 329, 335, 342, 343–350

(56) References Cited

U.S. PATENT DOCUMENTS

| | | |
|---|---|---|
| 4,750,147 A | 6/1988 | Roy, III et al. |
| 4,965,732 A | 10/1990 | Roy, III et al. |
| 5,274,844 A | 12/1993 | Harrison et al. |
| 5,530,449 A | 6/1996 | Wachs et al. |
| 5,546,090 A | 8/1996 | Roy, III et al. |
| 5,642,353 A | 6/1997 | Roy, III et al. |
| 5,828,658 A | 10/1998 | Ottersten et al. |
| 5,930,243 A | 7/1999 | Parish et al. |
| 6,037,898 A | 3/2000 | Parish et al. |
| 6,124,824 A * | 9/2000 | Xu et al. .................... 342/174 |
| 6,195,045 B1 * | 2/2001 | Xu et al. .................... 342/174 |

FOREIGN PATENT DOCUMENTS

| | | |
|---|---|---|
| WO | WO99/40689 A1 | 8/1999 |
| WO | WO99/57820 A1 | 11/1999 |

* cited by examiner

Primary Examiner—Bernarr E. Gregory
(74) Attorney, Agent, or Firm—Blakely, Sokoloff, Taylor & Zafman, LLP

(57) ABSTRACT

A method and apparatus are provided that determine a frequency dependent calibration vector for a set of transmit or receive chains of a radio communications system using only differential phase and amplitude between the transmit chains and the receive chains, respectively. In one embodiment, the invention includes an antenna array adapted to transmit and receive radio communications signals with a plurality of other terminals, a transmit chain to transmit a calibration signal through the antenna array to a transponder on at least two different frequency bands, and a receive chain to receive through the antenna array a transponder signal from the transponder, the transponder signal being received on at least two different frequency bands and being based on the calibration signal. A signal processor determines a frequency dependent calibration vector based on the at least two frequency bands of the transponder signal as received through the receive chain by comparing relative characteristics for the transponder signal at a first one of the at least two frequencies to relative characteristics for the transponder signal at a second one of the at least two frequencies.

26 Claims, 4 Drawing Sheets

CALIBRATION OF DIFFERENTIAL FREQUENCY-DEPENDENT CHARACTERISTICS OF A RADIO COMMUNICATIONS SYSTEM

BACKGROUND OF THE INVENTION

1. Field of the Invention

The invention relates generally to the field of digital signal communications and to receive and transmit chain calibration. More particularly, the invention relates to calibrating the differential group delay of the multiple receive or transmit chains of a radio communications system.

2. Description of the Related Art

Radio communications capacity can be greatly increased using directional, rather than omni-directional radio transmission. One way to transmit directional signals and directionally receive signals is by using beam forming and nulling through an array of antennas. The precision of the beam forming and nulling through the antenna array, can be improved if the transmit and receive chains are both calibrated. Calibration can be applied to the chain from the digital interface at baseband to the field radiated from or received at each antenna element. One way of making the calibration is to have a transponder separated from the antenna array listen to the output of the antenna array on a base station downlink frequency. The transponder receives a downlink calibration signal from the base station and then re-transmits it on an uplink frequency. By selecting appropriate signals to transmit and appropriate signals to receive, the base station can apply signal processing to estimate compensations in phase and amplitude to calibrate its transmit and receive chains.

A remote transponder calibration system is shown, for example, in U.S. Pat. No. 5,546,090 to Roy, III et al. That patent describes calibrating a narrowband FDD (frequency division duplex) system for phase and amplitude at each transmit and receive chain. In an FDD system, unused time and frequency slots typically occur on occasion and these can be used to send and receive a narrowband calibration signal. In a typical spread spectrum system, however, there are no unused time and frequency slots to use for calibration. A spread spectrum system, for example a CDMA (code division multiple access) system, as opposed to FDMA (frequency division multiple access) and TDMA (time division multiple access) systems, has multiple users using the same radio channel at the same time. If the transponder is designed to receive and transmit the signal using the same spread spectrum channel that is used for traffic, then the additional energy added to the channel by calibration will reduce system capacity. A typical transponder will receive all of the downlink traffic including the calibration signal, shift the frequency, amplify it and send all of the traffic back to the base station. This results in a very large amount of energy being sent by the transponder on the uplink and may effectively overpower all other traffic. As a result, calibration will affect both the downlink and uplink channel capacity.

For calibrating frequency-dependent group properties of a set of transmitters or receivers, a calibration signal must be transmitted at several different frequencies. However with a simple transponder, the actual values of phase and amplitude perturbations introduced into the transmitted or received chain by the transmit or receive chain cannot accurately be measured. This lack of information presents a significant obstacle to calibrating each part of an array to correct for the induced variations.

BRIEF SUMMARY OF THE INVENTION

A method and apparatus are provided that determine a frequency dependent calibration vector for a set of transmit or receive chains of a radio communications system using only differential phase and amplitude between the transmit chains and the receive chains, respectively. In one embodiment, the invention includes an antenna array adapted to transmit and receive radio communications signals with a plurality of other terminals, a transmit chain to transmit a calibration signal through the antenna array to a transponder on at least two different frequency bands, and a receive chain to receive through the antenna array a transponder signal from the transponder, the transponder signal being received on at least two different frequency bands and being based on the calibration signal. A signal processor determines a frequency dependent calibration vector based on the at least two frequency bands of the transponder signal as received through the receive chain by comparing relative characteristics for the transponder signal at a first one of the at least two frequencies to relative characteristics for the transponder signal at a second one of the at least two frequencies.

Other features of the present invention will be apparent from the accompanying drawings and from the detailed description that follows.

BRIEF DESCRIPTION OF THE SEVERAL VIEWS OF THE DRAWINGS

The present invention is illustrated by way of example, and not by way of limitations, in the figures of the accompanying drawings in which like reference numerals refer to similar elements and in which.

DETAILED DESCRIPTION OF THE INVENTION

Introduction

Figure 1:
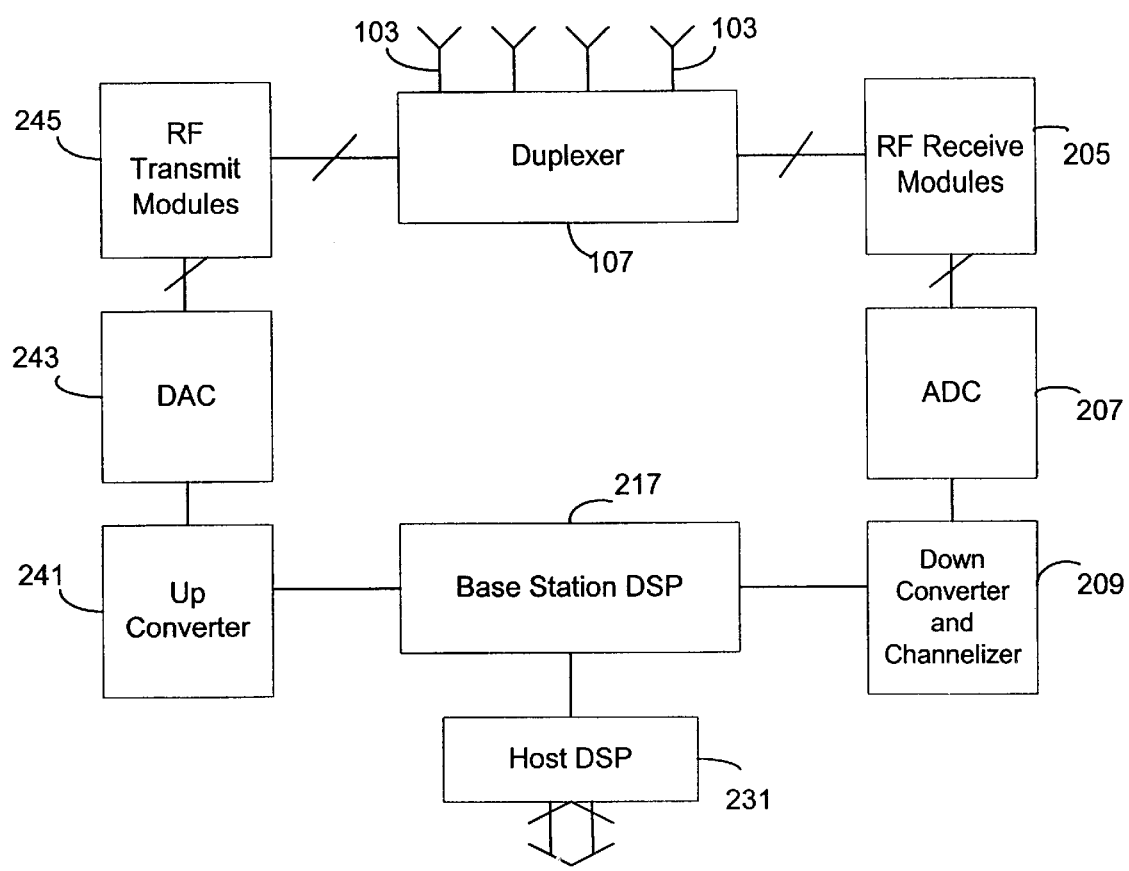
FIG. 1 is a block diagram illustrating an exemplary architecture of a wireless communication system base station appropriate for use with one embodiment of the present invention.

In one embodiment, the present invention includes a method for calibrating the group delay of multiple transmit and receive chains of a wideband adaptive antenna base station using a narrowband transponder. In order to calibrate the group delay of the transmit and the receive chains, the base station transmits a different narrowband calibration signal over each of the transmit chains on at least two different frequencies in the downlink frequency band. These signals are then received by the narrowband transponder and retransmitted to the base station as narrowband signals in the wideband uplink frequency band. In this application, the radios in the adaptive antenna base station support wideband channels. However, in order to avoid creating any unnecessary interference, the calibration signals and the transponder signals are narrowband. In other words, the calibration signals occupy only narrow portions of the wideband channel. The transponder only receives in these narrow frequency bands and only retransmits the signals in correspondingly narrow portions of the uplink band.

Since the narrowband signals add only a small amount of energy to the wideband uplink and downlink channels, the calibration can be done while regular data traffic is being supported by the base station. The narrower the bandwidth of the calibration signals, the less will be the amount of energy that will be added to the system. For wideband spread spectrum systems the narrowband signals can easily be one tenth, or one hundredth as wide as the regular data traffic channels. For frequency division systems, the narrowband signals can still be one third to one fifth the width of the traffic channels. Proper selection of the signal power levels can further reduce the impact on regular traffic. Using multiple narrowband signals and transponder bands it is possible to calibrate for more general phase and gain variations as a function of frequency. In a CDMA (Code Division Multiple Access) system, it is possible to design the CDMA system to be particularly insensitive to narrowband signals.

In one embodiment, the transponder only receives and re-transmits on narrow bands within the traffic bands of the wider band system to be calibrated. The system can have a set of wideband transmitters with antenna elements and a set of wideband receivers with antenna elements or a single set of elements can be common to the transmitters and the receivers. In both cases, system performance is normally improved with frequent calibration of the group delay for both the transmit chain and the receive chain. The group delay calibration vectors can be different for the receive chain and the transmit chain. In one example, the system has a multi-channel base station that communicates with multiple subscribers up to 10 km away using CDMA with SDMA (spatial division multiple access). For this system, it has been found that calibrations every hour or two will noticeably improve performance. With such frequent calibrations, the impact of calibration on normal operations can be important. According to the present invention, the impact of calibration on normal operations can be minimized with a narrowband calibration transponder.

On each narrow frequency calibration band, different signals can be transmitted through two or more transmit chains. The signals can be differentiated, for example, by modulating different sequences onto the signals. In one embodiment, the sequences are orthogonal sequences to aid in demodulation. In another embodiment, the sequences are modulated onto the signals as spreading codes. This allows de-spreading codes to be used on the received signal so that the signal from each transmit chain can be distinguished. The transponder receives these signals and re-transmits them in the base station uplink band. The signals received by the base station can then be processed in order to measure any desired relative characteristics of the signals. For example, the signals can be used to find the relative phase and amplitude of the involved transmit chains and the relative phase and amplitude of all the receive chains. By transmitting different signals over the different transmit chains, the signals can be differentiated when received. This allows characteristics such as relative phase and amplitude to be estimated separately for each transmit chain. The characteristics can be used to determine spatial signatures for the uplink and downlink as well as to calculate frequency dependent calibration vectors. Combining phase measurements at different frequencies, a group delay calibration vector can be derived.

The relative phase and amplitude of the transmit chains can be estimated by receiving the different signals at a single antenna and then estimating the channel for each of the different signals transmitted over the different transmit chains. The relative phase and amplitude of the receive chains can be estimated by transmitting a single calibration signal over a single transmit chain and receiving it over the different receive chains. The channel received over each receive chain can then be estimated and compared to find spatial signatures and for calibration. As a result, if the calibration signal is sent once over all transmit chains and then the corresponding transponder signal is received through all receive chains, the entire array can be calibrated based on a single downlink and uplink burst. Since the transmit and receive calibration vector determinations need not be coupled to each other, performing both calibrations on the same burst increases efficiency and reduces the effects on traffic. If the calibration signal is transmitted on two or more different frequencies either at the same time or at different times close together, then the group delay can be derived.

As an alternative, just a few or even two of the transmit or receive chains can be calibrated at one time. If all the transmit or receive chains are not involved in each calibration measurement, then repeated calibration measurements with different sets of transmit or receive chains can be performed so that all relative phases and amplitudes can be measured among all the transmit and receive antennas. Accuracy is improved if there is a common transmit or receive chain in each of the measurements. This allows the measured phases and amplitudes to be related to each other with reference to the common chain. Typically, one of the receive chains is designated as a reference receive chain and calibration signals are measured in pairs with each receive chain being paired with the reference chain. Since the reference chain participates in every measurement, all of the other chains can be referenced to each other through the reference chain. After the receive chains are calibrated, a similar process is performed with the transmit chains being measured in pairs against the reference. It is not important which particular chain is selected to be the reference and the receive and transmit references need not have any relationship to each other. The calibration vectors can be expressed as variations from the reference or from any arbitrary standard such as an average, mean, or median of the differences between the receive or transmit chains, respectively.

In one embodiment, the present invention is implemented in an SDMA radio data communications system. In such a spatial division system, each terminal is associated with a set of spatial parameters that relate to the radio communications channel between, for example, the base station and a user terminal. The spatial parameters comprise a spatial signature for each terminal. Using the spatial signature and arrayed antennas, the RF energy from the base station can be more precisely directed at a single user terminal, reducing interference with and lowering the noise threshold for other user terminals. Conversely, data received from several different user terminals at the same time can be resolved at lower receive energy levels. With spatial division antennas at the user terminals, the RF energy required for communications can be even less. The benefits are even greater for subscribers that are spatially separated from one another. The spatial signatures can include such things as the spatial location of the transmitters, the directions-of-arrival (DOAs), times-of-arrival (TOAs) and the distance from the base station.

Estimates of parameters such as signal power levels, DOAs, and TOAs can be determined using known training sequences placed in digital data streams for the purpose of channel equalization in conjunction with sensor (antenna) array information. This information is then used to calculate appropriate weights for spatial demultiplexers, multiplexers, and combiners. Extended Kalman filters or other types of linear filters, well known in the art, can be used to exploit the properties of the training sequences in determining spatial parameters. Further details regarding the use of spatial division and SDMA systems are described, for example, in U.S. Pat. No. 5,828,658, issued Oct. 27, 1998 to Ottersten et al. and U.S. Pat. No. 5,642,353, issued Jun. 24, 1997 to Roy, III et al.

Base Station Structure

The present invention relates to wireless communication systems and may be a fixed-access or mobile-access wireless network. It may use spatial division technology in combination with wideband multiple access systems, such as code division multiple access (CDMA), and other spread spectrum type systems. FIG. 1 shows an example of a base station of a wireless communications system or network suitable for implementing the present invention. The system or network includes a number of subscriber stations, also referred to as remote terminals or user terminals, (not shown). The base station may be connected to a wide area network (WAN) through its host DSP 231 for providing any required data services and connections external to the immediate wireless system. To support spatial division, a plurality of antennas 103 is used, for example four antennas, although other numbers of antennas may be selected.

The outputs of the antennas are connected to a duplexer switch 107, which in this CDMA system is a frequency switch. Alternatively, separate transmit and receive antenna arrays can be used, in which case the duplexer is not necessary. When receiving, the antenna outputs are connected via the switch 107 to RF (radio frequency) receive modules 205, and are mixed down and channelized in a down converter 207. The down converted signals are then sampled and converted to digital in an ADC (analog to digital converter) 209. This can be done using FIR (finite impulse response) filtering techniques. The invention can be adapted to suit a wide variety of RF and IF (intermediate frequency) carrier frequencies and bands.

There are, in the present example, four antenna channel outputs, one from each antenna receive module 205. The particular number of channels can be varied to suit network needs. For each of the four receive antenna channels, the four down-converted outputs from the four antennas are fed to a digital signal processor (DSP) device 217 for further processing, including calibration. According to one aspect of this invention, four Motorola DSP56300 Family DSPs can be used as channel processors, one per receive channel. The timeslot processors 217 monitor the received signal power and estimate the phase and time alignment. They also determine smart antenna weights for each antenna element. These are used in the spatial division multiple access scheme to determine a signal from a particular remote user and to demodulate the determined signal.

The output of the channel processors 217 is demodulated burst data. This data is sent to the host DSP 231 whose main function is to control all elements of the system and interface with the higher level processing. The higher level processing provides the signals required for communications in all the different control and service communication channels defined in the system's communication protocols. The host DSP 231 can be a Motorola DSP56300 Family DSP. In addition, channel processors send the determined receive weights for each user terminal to the host DSP 231.

The host DSP 231 maintains state and timing information, receives uplink burst data from the channel processors 217, and programs the channel processors 217. In addition, it decrypts, descrambles, checks error detecting code, and deconstructs bursts of the uplink signals, then formats the uplink signals to be sent for higher level processing in other parts of the base station. With respect to the other parts of the base station, it formats service data and traffic data for further higher processing in the base station, receives downlink messages and traffic data from the other parts of the base station, processes the downlink bursts and formats and sends the downlink bursts to the transmit chain, discussed below.

Transmit data from the host DSP 231 is used to produce analog transmit outputs which are sent to the RF transmitter (tx) modules 245. Specifically, the received data bits are converted via a DAC (digital to analog converter) 241 to analog transmit waveforms and up-converted into a complex modulated signal, at an IF frequency in an upconverter 243. The analog waveforms are sent to the transmit modules 245. The transmit modules 245 up-convert the signals to the transmission frequency and amplify the signals. The amplified transmission signal outputs are sent to antennas 103 via the duplexer/time switch 107.

Narrowband Transponder Structure

Figure 2:
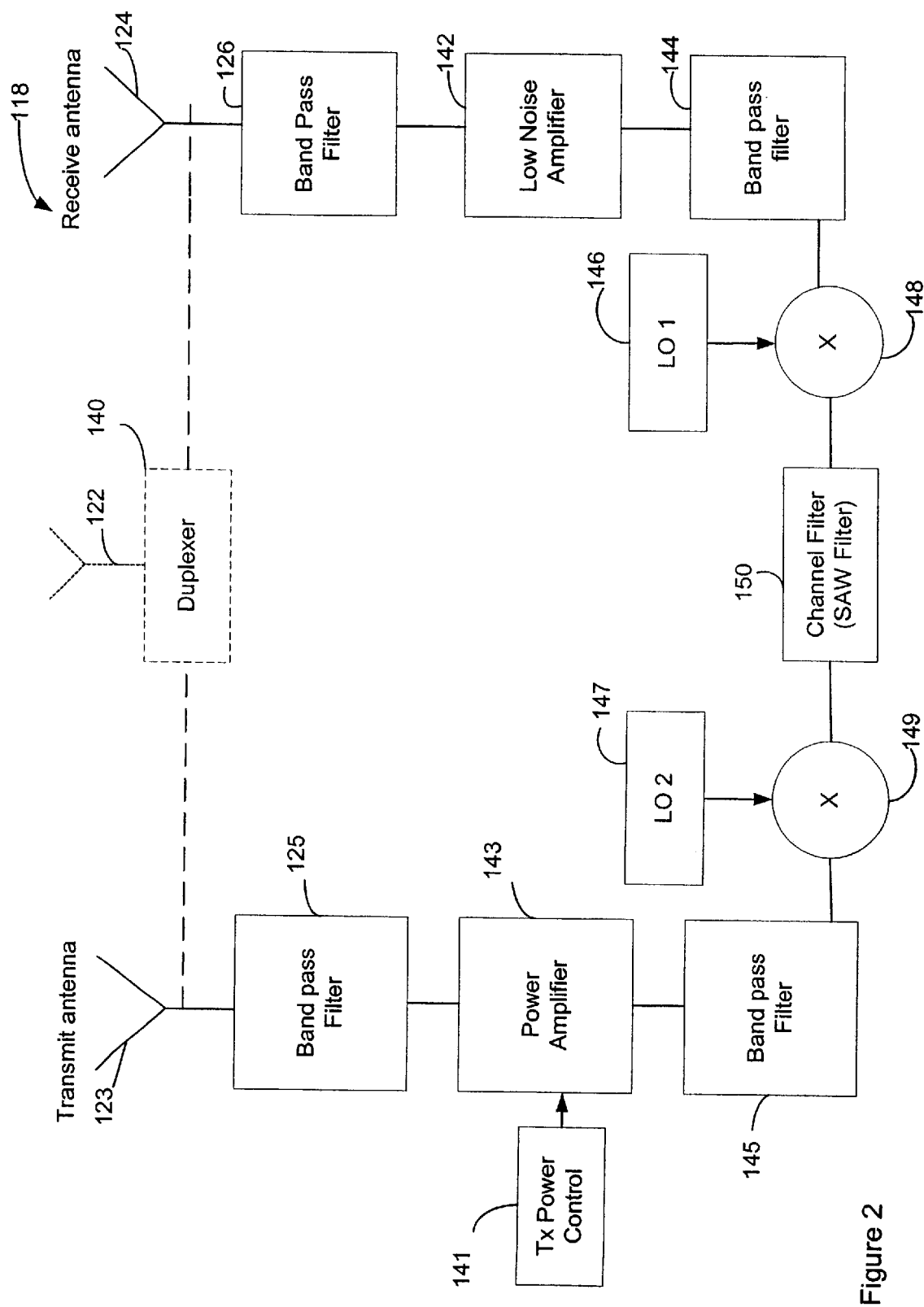
FIG. 2 is a block diagram illustrating an exemplary architecture of a wireless transponder system appropriate for use with the base station of FIG. 1.

Referring to FIG. 2, an example of a remote transponder, suitable for use in implementing the present invention is shown. This transponder is designed to be inexpensive and simple. The particular transponder design shown can also be made in a small, portable, and lightweight package that can be used at the installation of the base station, if desired. The transponder can be mounted on a nearby fixture or even on the antenna mast that is used by the base station's antennas. Alternatively, the transponder can instead be operated as a special mode of a much more complex and fully functional user terminal. A second base station can also perform the transponder functions. The function of the transponder 118 is to receive a signal in the range of the wideband downlink channel, up-convert or down-convert it to the wideband uplink channel, filter it to select only a narrow frequency band, amplify it, and then re-transmit it as a signal in the range of the uplink channel. As mentioned above, frequency-shifting transponder 118 is only one possible example of a transponder suitable for use in calibration. The only general requirement for the transponder is that it transmit back a radio frequency signal that is somehow distinguishable from the signal it received. Besides frequency shifting the signal, the transponder can also time delay the signal, or more generally modulate it with various well-known modulation schemes. For a code division multiplex system, the transponder can also decode the received signal and encode it with a new spreading code for the uplink channel.

As shown in FIG. 2, the calibration signal from the base station is received at the transponder antenna 122. A duplexer 140 separately routes signals received at the antenna to the receive chain beginning with a receive bandpass filter 126 and signals coming from the transmit chain, ending with a transmit bandpass filter 125. In the receive chain, signals coming from the transponder antenna after filtering 125 are routed to a low noise amplifier (LNA) 142. This amplified signal is then filtered again by a bandpass filter 144, which eliminates unwanted signals based on their frequencies. This filtered signal is then down-converted to IF (intermediate frequency) by a mixer 148 that combines the received signal with a LO (local oscillator signal) 146 waveform. The IF signal is processed through another bandpass filter 150 before upconversion for transmission. The channel filter 150 can be configured to have two or more passbands, one for each of the frequencies of the calibration signal from the base station.

A second mixer 149 combines the signals from the bandpass filter 150 and a second LO 147 to produce two new transmit signals at frequencies spaced apart from each other and within the uplink frequency band. These two new signals are bandpass filtered 145 and amplified in a power amplifier 143. The power amplifier is adjusted by a power feedback control loop 141 to reduce interference with other channels and smooth reception of the calibration signal at the base station. Another bandpass filter 125 eliminates the upper mixer product and any artifacts from the power amplifier, leaving only the lower mixer product which is a copy of the original input signal on the RF receive chain except for its frequency. This signal is connected to the duplexer 140 for transmission through the antenna element 122. The transponder shows, as an alternative, a separate transmit antenna element 123 and receive antenna element 124. If separate elements are used then the duplexer 140 is no longer required and the antennas can be directly coupled to the respective transmit and receive bandpass filters.

The transponder described above is designed to shift and transpond narrowband signals from the base station that are transmitted in the band for North American cellular CDMA communications, designated as IS-95 by the Telecommunications Industry Association (TIA). In some circumstances, it might be desirable to receive a wideband calibration signal over the complete CDMA channel and return it as a narrowband signal. Since most single channel communication bandwidths are too wide for practical filters at RF frequencies, such a single channel transponder would mix the RF frequency down to a lower intermediate frequency, apply a narrowband filter at this intermediate frequency, and then mix the filtered signal back up to the desired RF frequency to be echoed back as a narrowband signal. In all other aspects, the wideband, single channel, transponder would behave and be constructed like the narrowband transponder described here.

To determine group delay, at least two frequencies of the calibration signal are desired. To return the two frequencies of the calibration signal, the transponder can be configured to return the two narrowband signals shifted in frequency. Alternatively an additional transponder with unique or some shared hardware can be used. Each transponder can be configured to receive and transmit only in a narrow band or to receive and transmit a broad range of different frequencies. The particular design of the multiple frequency transponder system will depend on the particular circumstances of the application and the communication system.

In operation, the base station DSP 217 generates a specialized narrowband calibration transmit signal on at least two frequencies which it transmits from the antenna array through the duplexer. The transponder receives the calibration transmit signal and echoes it back with the appropriate changes so that it will be received through the receive chain through the duplexer. In a conventional cellular CDMA system, the radio system uses different frequencies for transmit and receive. Thus, the transponder echoes back a signal on the uplink frequency band that is a frequency-shifted copy of the downlink signal it receives. The base station DSP acquires the echoed calibration signal on both frequencies through the receive chain and uses this received calibration signal along with knowledge of the transmit calibration signal to calculate group delay vectors which are then stored in a group delay calibration vector storage buffer.

For a CDMA cellular system, the system may be allocated a bandwidth from, e.g., 824 MHz to 835 MHz or from 835 MHz to 849 MHz. The wideband channels within this range may be as narrow as 1.25 MHz or as wide as 5 MHz. In such a system, uplink and downlink frequency bands are typically separated from each other with a significant guard band so that they are separated by 1.25 MHz to 5 MHz. This is the amount by which the transponder must shift the calibration signal frequency to send it back to the base station. In other systems, the wideband uplink and downlink channels may be as wide as 40 MHz or more. The narrowband calibration signals on the other hand, would typically be from 0.01 MHz to 0.1 MHz wide. The spectral width of the calibration signal will be as small as reasonably convenient with readily available equipment at moderate cost. The narrower the signal, the less it will interfere with existing traffic. However, as mentioned above, the narrowband signal must also be able to be transmitted and received by the wideband transmit and receive chains. The necessary bandwidth limitations will also depend on the particular system. For a system in which the wideband signals are 1.25 MHz wide, the narrowband signals will probably be much narrower than for a system in which the wideband signals are 40 MHz wide. The particular carrier frequencies used can also be adapted to suit the needs of the particular system. Currently, appropriate systems have carrier frequencies centered at frequencies ranging from 450 MHz to 2100 MHz. This range is expected to become greater as radio technologies and spectrum allocations change.

Calculation of Calibration Vectors

There are a variety of different ways to calculate and calibrate the phases and amplitudes of a multiple antenna array using narrowband signals and a transponder. U.S. Pat. No. 5,546,090 issued Aug. 13, 1996 to Roy, III et al., U.S. Pat. No. 5,930,243 issued Jul. 27, 1999 to Parish et al. and U.S. Pat. No. 6,037,898 issued to Parish et al. show suitable approaches to calibration. The disclosures of these U.S. patents are hereby incorporated by reference herein. Another approach is shown in International Application No. WO99157820, published Nov. 11, 1999 of Boros et al.

With respect to calibrating the group delay for the transmit and receive chains of the base station, assuming identical RF propagation on the uplink and downlink, a single transponder or subscriber unit can be used together with its base station to carry out the calibration. However, the present invention enables the separate determination of the uplink and downlink signatures for the transponder or any subscriber unit. These spatial signatures include the effects of the electronic signal paths in the base station hardware and any differences between the uplink and downlink electronic signal paths for the transponder or subscriber unit. One use of such information is to determine separate calibrations for each subscriber unit when the RF propagation to and from the subscriber unit is different. Another use is for calibrating the base station, but rather than obtaining a single calibration vector using the base station and a single transponder, using several transponders to determine the single calibration vector.

In one embodiment, the single calibration vector is the average calibration vector. In another embodiment, it is the weighted average calibration vector. The weighting given to the estimate made using a particular subscriber unit will depend on a measure of the quality of the signal received by that subscriber unit, so that estimates from subscriber units having better quality signals are weighed more in the weighted average. A method and apparatus for determining signal quality is disclosed in International Application No. WO99/40689, published Aug. 12, 1999 of Yun.

the architecture of FIGS. 1 and 2, the base station DSP generates a set of signals that are used for calibration. In one example, all antennas transmit different known calibration signals so that the channel from each transmit antenna to each receive antenna can be calculated. Generally, after subtracting out the components specific to the transponder's location, a receive calibration vector can then be estimated from the difference in phase and amplitude with frequency of the channels from one transmit antenna to each receive antenna. By averaging the results from all the transmit antennas, the calibration vector can be improved still further. Correspondingly, a calibration vector of the transmit chains can be estimated, after subtracting out the transponder specific components, from the relative phases and amplitudes of the channels from different transmit antennas to one of the receive antennas. Again, averaging the results from all the different receive antennas can improve the estimate.

Using the two or more narrow band transponder returns, the relative phase and amplitude of the transmit and receive chains can be calibrated at two frequencies within the base station downlink and uplink bands, respectively. The measurements can also be used for calibrating group delay and any other frequency dependent differences between the receive or transmit chains. Higher accuracy can be obtained if the two narrow frequency bands are placed some distance apart within the traffic bands. Higher accuracy can also be obtained by using more than two different frequencies. The best choice of calibration frequencies and numbers of different frequencies will depend on the bandwidth of the traffic bands and the desired accuracy.

Because a group delay can be regarded as equivalent to a phase ramp with a specific slope, the relative difference in group delay among the transmit and receive chains, respectively, can be calibrated using the phase measurements. This can be done by computing the slopes of the phase ramps based on the phase measurements at the two frequencies within the bands. Using only two frequencies there is an ambiguity in each phase measurement due to phase wrapping, the relative phase between the two measurement frequencies can only be determined to within a phase window of 360 degrees. As a result, any group delay changes and differences within the delay corresponding to a phase shift of 360 degrees between the two measurement frequencies can be measured and compensated for. The phase window can be enlarged by measuring more frequencies.

The group delay can be determined directly from a phase calibration process. If the system is calibrating the various receive and transmit chains for phase and amplitude differences, the phase determinations from that process can be used to find the group delay. Group delay can also be determined using relative phase measurements that are calculated apart from any phase calibration process. The phase calibration will give a calibration vector with a calibration coefficient $\alpha_{ij}$ for each antenna i and frequency j. The actual phase $\phi_{ij}$ of an antenna i at frequency j can be expressed as $\phi_{ij} = \alpha_{ij} + \delta_j$, where $\delta_j$ is an arbitrary unknown phase term that is common to all antennas at frequency j. The value of $\delta$ need not be known in order to calibrate the transmit or receive chain with respect to the other chains. Only the relative phases characterized by the $\alpha$'s is needed.

For group delay, the difference between different transmit or receive chains is used. For a single frequency j, this difference $\Delta\phi_j$ between antenna i and i' can be expressed as $\Delta\phi_j = \phi_{ij} - \phi_{i'j} = \alpha_{ij} + \delta_j - (\alpha_{i'j} + \delta_j) = \alpha_{ij} - \alpha_{i'j}$. The group delay between the antennas i and i' is obtained by comparing the difference in phase $\Delta\phi$ at different frequencies. For frequencies j and j', the group delay is therefore proportional to $\Delta\phi_j - \Delta\phi_{j'}$. Using the phase calibration vectors $\alpha$'s at the two different frequencies, the relative group delay can quickly be determined.

In the process described above, $\delta_j$ the arbitrary unknown phase term that is common to all antennas at frequency j remains unknown. This term can also vary over time. For example if frequency $f_1$ is repeatedly measured, the measured signature can be expressed as $e^{j\Phi}a_1$, where a is the measurement vector at frequency $f_1$ containing elements $a_1$, $a_2$, $a_3$, ... and the phase $\phi$ changes with each measurement. Alternatively, the measured phase can be normalized so that some component, for example, the first component, is real. In either case, the absolute phase is not measured.

As a result, the absolute group delay cannot easily be determined using the phase calibration values, however correcting for relative phase delays between the different transmit and receive chains significantly enhances performance. These relative phase differences constitute the differential phase delay between the transmit and receive chains of the system. Current digital signal processing technology can accommodate a frequency dependent phase variation from a single transmitter. If the phase variations from multiple transmitters can be aligned, then the variations in the multiple transmitter system can be accommodated by the receiver in the same way as from a single transmitter. If the phase variations differ among the transmitters, the transmitted signal becomes much more difficult to resolve. Accordingly while a calibration that corrects for absolute group delay may be desirable in some applications, calibration for relative group delay is very useful. The more the differences between the transmit or alternatively, receive chains, can be reduced the higher the system's performance.

Using phase and amplitude measurements, calibration vectors can be formed and applied to transmissions by the base station. One approach uses spatial signatures from the receive chains of an antenna system and, using signatures at two different frequencies imposes a linear phase shift ramp. The spatial signatures can be made up of a vector or a set a of phase and amplitude measurements for each receive or transmit chain. They can be represented as $a_j$ and $a_{j'}$, where $a_j$, for example, represents a set of values $a_{j1}, a_{j2}, a_{j3}, \ldots a_{jM}$ for each of M receive or transmit chains i=1, 2, 3, ... M, at the frequency j. These two signatures are combined to derive the frequency dependent calibration factor c(f).

While a linear fit for c(f) provides for a simple and quick determination of the calibration vector using only two measured frequencies, as shown below, more frequencies can be measured and any variety of other curves or shapes can be matched to the measured results. The choice of an interpolation or curve matching algorithm as well as the choice of the number of different frequencies to measure will depend on a balance between calibration complexity and signal quality. The quality of the equalizers and the demodulators as well as the width of the frequency bandwidth of the system will likely also be considered among other factors.

To calibrate differential amplitude shifts with frequency, a frequency dependent amplitude calibration factor $|g_i(f)|$ for each antenna i=1, ... M can be determined by linear interpolation:

$$|g_i(f)| = [(f-f_1)/(f_2-f_1)]|a_{1,i}| + [(f_2-f)/(f_2-f_1)]|a_{2,i}|$$

for $f_2 \geq f \geq f_1$, where $f_2$ corresponds to frequency j', $f_1$ corresponds to frequency j, $a_{1,i}$ corresponds to the phase and amplitude measurement for antenna i at frequency $f_1$ and $a_{2,i}$ corresponds to the phase amplitude measurement for antenna i at frequency $f_2$. Linear extrapolation can be used to extend the amplitude calibration factor outside the interval between the two measured frequencies $f_1, f_2$.

To determine a phase portion of the calibration vector c(f), a modified linear interpolation that compensates for the phase wrapping can be used. As mentioned above, there is a relative phase window of 360 degrees or $2\pi$, at which point, the phase wraps back around to zero. If angle (a) is an angle in degrees that can take any value from −180 degrees up to but not including 180, angle (a) $\in$ (−180, 180], and angle (a) corresponds to the complex number a, and a* is the complex conjugate of a, then the calibration phase $\phi_i(f)$ for antenna i at frequency f can be expressed as shown below.

$$\phi_i(f)=[(f-f_1)/(f_2-f_1)] \text{ angle } (a_{1,1})^* a_{2,i} + \text{angle } (a_{1,1})$$

for i=1, . . . M and the overall calibration factor is equal to the combination of the amplitude and phase calibration factors which can be expressed as shown below:

$$c_i(f)=|g_i(f)|e^{j(180/\pi)\phi_i(f)}$$

Method of Operation

Figure 3:
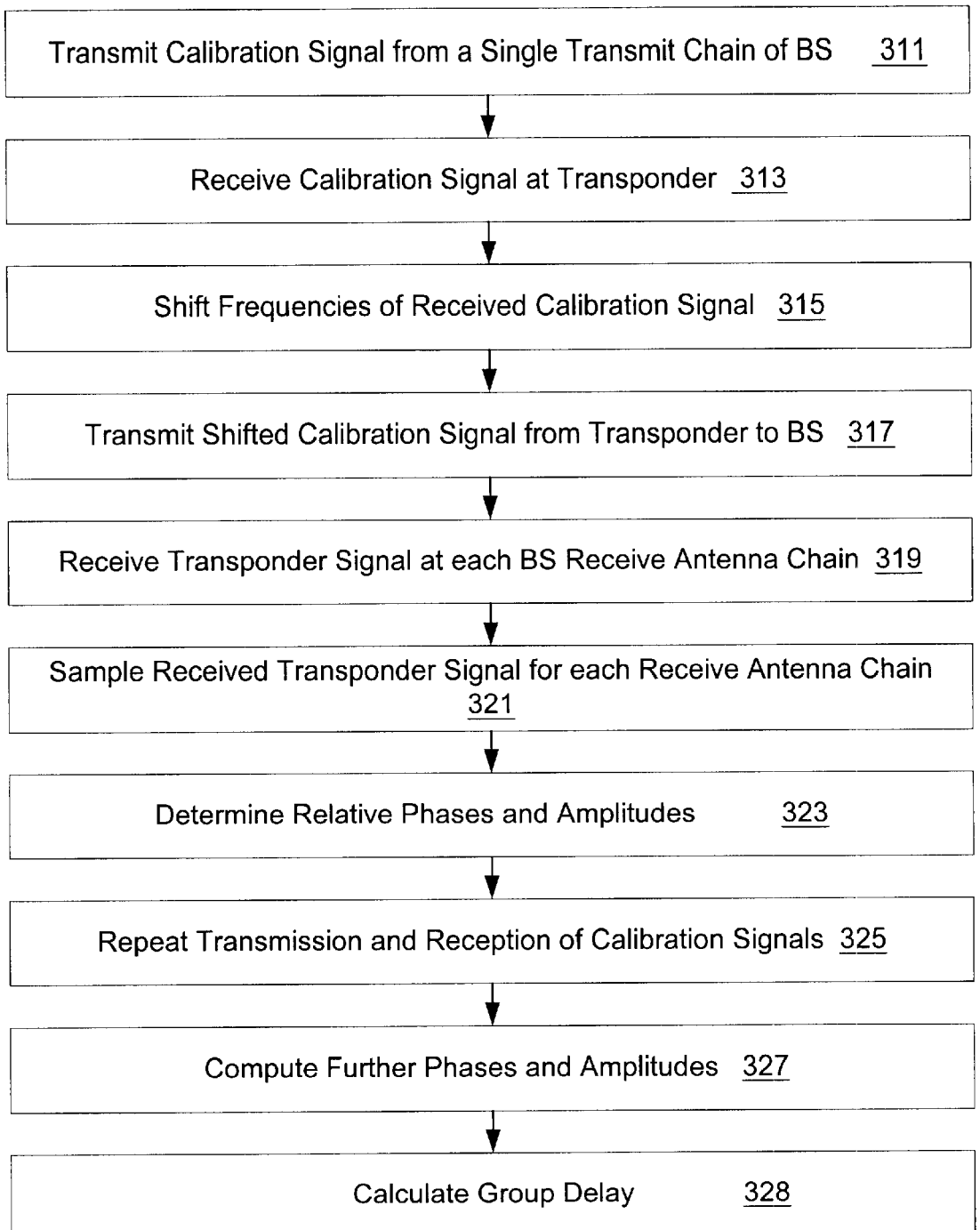
FIG. 3 is a process flow diagram showing the calibration of a receive chain.
Figure 4:
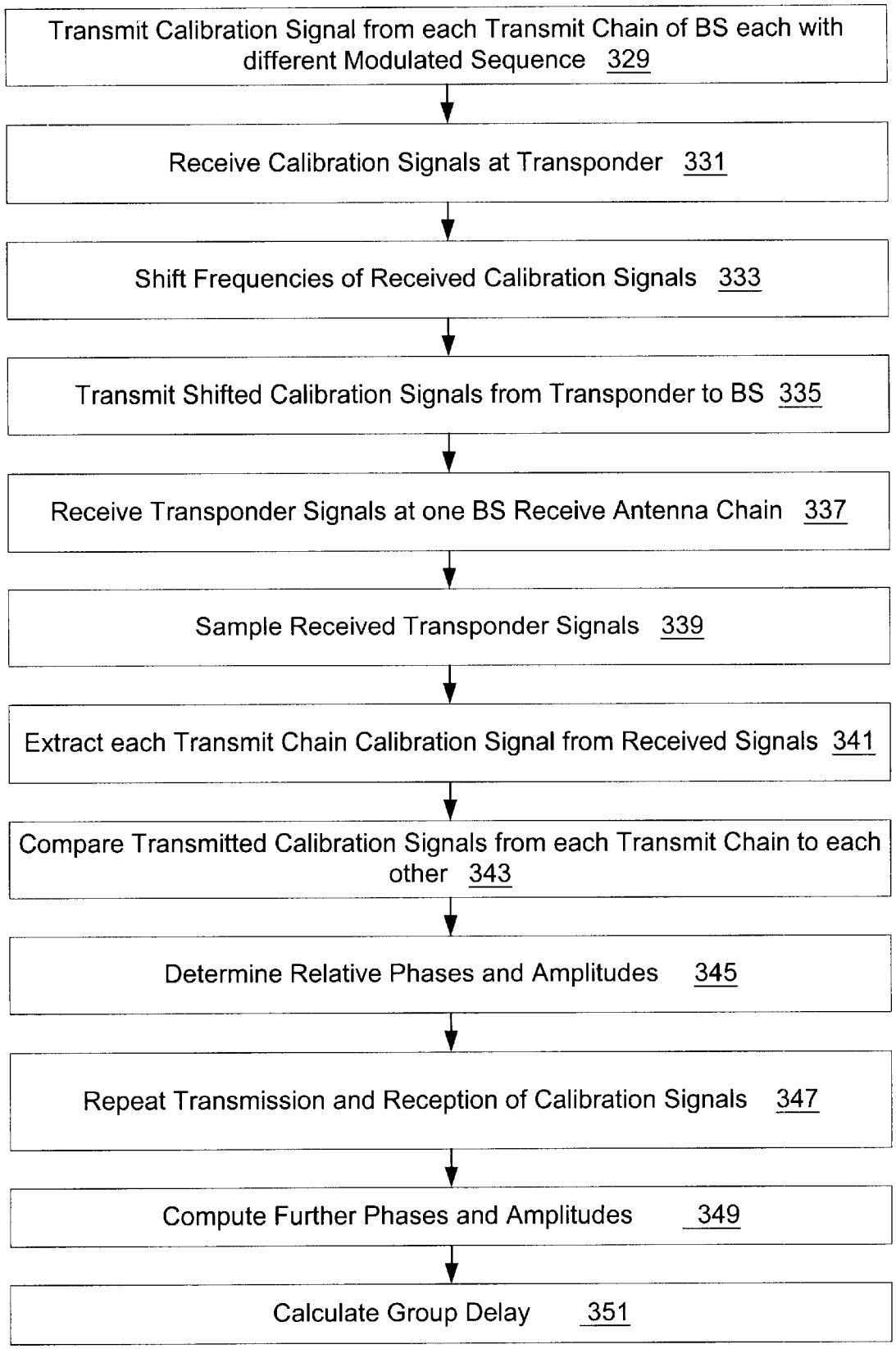
FIG. 4 is a process flow diagram showing the calibration of a transmit chain.

An example of an operational process for calibrating a group of receive chains for group delay is shown in FIG. 3. Other frequency dependent calibration vectors can be determined using a similar process. The calibration process typically includes calibrating the receive chain and the transmit chain with the same set of samples. Calibration of the transmit chains is shown in FIG. 4. To begin a calibration cycle for the receive chain, the base station (BS) (see e.g. FIG. 1) will generate a calibration signal. As discussed above, this is typically a narrowband signal at two or more frequencies. This narrowband transmit calibration signal is then transmitted from a single transmit chain of the base station 311. The transmission can occur at any time during the regular use of the base station for normal operation due to the small amount of additional energy added to the existing wideband data traffic by the narrowband signal. While only one transmit chain is required, transmitting from all of the transmit chains at once provides more samples for the receive calibration algorithms.

The transmitted narrowband calibration signal is received at the transponder 313, (see e.g. FIG. 2). If the calibration signal is a wideband signal, it is converted to a set of at least two narrowband waveforms using appropriate bandpass filters as discussed above. If the signal has a particular spreading sequence or is modulated with a particular data or training sequence, this can be demodulated and a new signal can be modulated onto the signal. In one embodiment, the calibration signal is a narrrowband signal, which is simply received, shifted in frequency 315, and transmitted back to the base station 317. This approach simplifies the transponder and eliminates many other potential causes of errors. The frequency shifted calibration signal can also be shifted to two or more different frequencies and retransmitted so that calibration can be performed across different narrow frequency bands. However, the same effect can be achieved with a simpler transponder by sending several different calibration signals from the base station, each at a different frequency for the downlink. Each signal will be shifted to a different frequency for the uplink.

The base station receives the transponder signal at each of its receive antenna chains 319. These received transponder signals are sampled for each receive antenna chain 321 and the samples can be used to measure any number of characteristics of the received signal. Each set of samples from each receive chain represents a different view of the same narrowband transponder signal. To enhance reception, the DSP 217 will typically use narrow bandpass filters to eliminate most of the data traffic signal energy and isolate the received transponder signal. The received transponder signal is used to calculate a set of phases, for example the $\alpha$'s discussed above and amplitudes 323 The calculation in support of group delay will typically be based on comparing the received transponder signal as it was received by each receive chain to each signal as received by each other receive chain. This is commonly done by measuring phases and amplitudes and using a covariance matrix, for example. As an alternative, the signal can be sampled at only two receive chains. This will allow the two selected chains to be calibrated against each other. By repeating the process for each possible combination or for each receive chain against a receive chain selected to be the reference, a set of relative phase measurements can be obtained.

The process of transmitting and receiving calibration signals described above can then be repeated and the results averaged or stored 325. Further relative phases and amplitudes are calculated using the additional data 327 and a group delay is calculated 328. This group delay is typically in the form of a calibration vector composed of a set of phase and amplitude correction factors for each transmit and receive chain, as discussed above. Alternatively, the resulting calibration vector can be applied and the process repeated to find a new vector that is used to adjust the first vector. By applying the adjusted calibration vector after each cycle, the calibration should become progressively more accurate until it converges on the limit of the calibration system's accuracy. The transmission, reception and computations can be repeated for different combinations of receive chains and even for different transponders. Over time, the characteristics of the receive chains can change and so the process can also be repeated in order to update the calibration vectors with changing conditions. When the calibrations are done against a reference chain, pairing each receive chain against the reference, the reference chain's vectors can be set at one, or some other normalized set of values, so that the vectors for the other receive chains represent the variance from the reference chain. Alternatively, the vectors can represent the variance from any other value, for example an average, mean or median response.

Calibration of the transmit chain is done in a similar way as shown in FIG. 4. As with the receive chain, a calibration signal is transmitted to the transponder. In this case, the calibration signal is transmitted from each of the base station's transmit chains 329. So that they can be distinguished from each other when received, each receive chain uses a different modulation sequence. As with the receive calibration, this signal is a narrowband signal at at least two different frequencies. The narrowband signal allows the transponder to have a simple construction.

The calibration signals are received at the transponder 331. Which then, as with the receive calibration, shifts the frequency of the received calibration signals 333. After that, the shifted calibration signals are transmitted back to the base station 335. It is again possible to change modulated sequences or spreading codes but the simplest transponder will take the narrowband signal that it receives in the downlink band and transmit it back as a virtually identical narrowband signal in the uplink band.

The base station receives the transponder signals this time at just one receive antenna chain 337. The received transponder signals are sampled 339 and then the unique modulated sequences are used to extract each transmit chain calibration signal 341 from the sampled waveform. As with the receive calibration, a narrow bandpass filter is typically used to isolate the transponder signal. For calibration purposes, the transmitted calibration signals from each transmit chain are compared to each other 343. In order to make it easier to distinguish the simultaneously received signals from the different transmit chains, the number of simultaneous transmit chains can be reduced. For example, one of the transmit chains can be designated as the reference and then each other transmit chain can transmit with the reference, one pair at a time, until all the transmit chains have been calibrated against the reference. This is similar to the pair-wise receive chain calibration mentioned above.

These comparisons become the basis for generating a set of relative phases and amplitudes 345. The process of sending and receiving calibration signals can then be repeated 347 and further relative phases and amplitudes computed 349 to refine the results. Then, the transmit group delay calibration vector can be calculated for each transmit chain 351. In one embodiment, the calibration vector determined in the first round is applied to each transmit chain, and then the process is repeated. The next calibration cycle will lead to greater accuracy as the gross errors have already been compensated. This is similar to performing a coarse tuning process and then a fine-tuning process.

The present invention provides many advantages over the prior art. Calibrations can be performed using only a simple, inexpensive transponder. Both transmit and receive calibration can be determined in a single transaction and the method self-corrects for reference frequency offsets in the antenna array system. Accordingly, calibration in accordance with the present invention is inherently accurate. While the invention has been described primarily as a calibration of a base station using a remote transponder, it can be applied to remote user terminals that have multiple antennas. It can also be applied to any other type of wireless network with multiple antenna system whether one with base stations and remotes, equal peers or masters and slaves.

To improve the reception of regular traffic during calibration, it may be desirable to apply a notch filter at the base station to filter out the transponder signal bands. This would typically be a digital filter and can be turned off when no calibration signal is active. The subscriber units could similarly have a notch filter for the calibration signal from the base station.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps. The steps of the present invention may be performed by hardware components, such as those shown in FIGS. 1 and 2, or may be embodied in machine-executable instructions, which may be used to cause a general-purpose or special-purpose processor or logic circuits, such as a DSP programmed with the instructions to perform the steps. Alternatively, the steps may be performed by a combination of hardware and software.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media or machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Importantly, while the present invention has been described in the context of a wireless spread spectrum data system for mobile remote terminals, it can be applied to a wide variety of different wireless systems in which data is exchanged. Such systems include voice, video, music, broadcast and other types of data systems without external connections. The present invention can be applied to fixed user terminals as well as to low and high mobility terminals. Many of the methods are described herein in a basic form but steps can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

What is claimed is:

1. A radio communications system comprising:
    an antenna array adapted to transmit and receive radio communications signals with a plurality of other terminals;
    a transmit chain to transmit a calibration signal through the antenna array to a transponder on at least two different frequency bands;
    a receive chain to receive through the antenna array a transponder signal from the transponder, the transponder signal being received on at least two different frequency bands and being based on the calibration signal; and
    a signal processor to determine a frequency dependent calibration vector based on the at least two frequency bands of the transponder signal as received through the receive chain by comparing relative characteristics for the transponder signal at a first one of the at least two frequencies to relative characteristics for the transponder signal at a second one of the at least two frequencies.

2. The system of claim 1, wherein determining a frequency dependent calibration vector comprises comparing relative phases for the transponder signal at a first one of the at least two frequencies to relative phases for the transponder signal at a second one of the at least two frequencies to determine a group delay.

3. The system of claim 1, wherein the transponder signal is shifted in frequency as compared to the calibration signal.

4. The system of claim 1, wherein the relative characteristics comprise the relative phases and amplitudes of the transponder signal as received by the receive chain.

5. The system of claim 4:
    wherein the receive chain comprises a plurality of receive chains;
    wherein each receive chain receives the transponder signal;

wherein the frequency dependent calibration vector comprises group delay; and wherein the signal processor determines a group delay by comparing the relative phases and amplitudes of the transponder signal at each frequency as received by each receive chain.

6. The system of claim 5 wherein determining a frequency dependent calibration vector comprises determining a receive chain group delay by comparing a phase difference between at least two receive chains for the transponder signal at a first one of the at least two frequency bands to a phase difference between the same two receive chains for the transponder signal at a second one of the at least two frequency bands.

7. The system of claim 6, wherein one of the plurality of receive chains is selected as a reference receive chain and the group delay for each receive chain is characterized with respect to the reference receive chain.

8. The system of claim 4 wherein the relative characteristics comprise measured phases and amplitudes of the transponder signal, wherein the signal processor determines an uplink signature of the transponder at the antenna array at each frequency of the transponder signal using the measured phases and amplitudes of the transponder signal and wherein the signal processor determines the frequency dependent calibration vector for the receive chain using the uplink signatures of the transponder.

9. The system of claim 4 wherein the relative characteristics comprise measured phases and amplitudes of the transponder signal, wherein the signal processor determines a downlink signature of the transmit chain at the transponder using measured phases and amplitudes at each frequency of the transponder signal and wherein the signal processor further determines the frequency dependent calibration vector for the transmit chain using the downlink signatures of the transmit chain.

10. The system of claim 4:
wherein the transmit chain comprises a plurality of transmit chains;
wherein each transmit chain transmits the calibration signal;
wherein the frequency dependent calibration vector comprises group delay; and
wherein the signal processor determines a frequency dependent transmit calibration vector by comparing the relative phases of the transponder signal at each frequency of the transponder signal as received by each receive chain.

11. The system of claim 10, wherein the calibration signal comprises a plurality of signals, one from each transmit chain, each signal being individually identifiable based on a unique modulation sequence.

12. The system of claim 10 wherein determining a frequency dependent transmit calibration vector comprises comparing a phase difference between two transmit chains for the transponder signal at a first one of the at least two frequencies to a phase difference between the same two transmit chains for the transponder signal at a second one of the at least two frequencies to determine a group delay.

13. The system of claim 12 wherein one of the plurality of transmit chains is selected as a reference chain and the group delay of each transmit chain is defined with respect to the reference chain.

14. The system of claim 1, wherein the radio communication signals are adapted to conform to a code division multiple access standard.

15. A machine-readable medium having stored thereon data representing instructions which, when executed by a machine, cause the machine to perform operations comprising:
transmitting radio communications signal to a plurality of other terminals using a transmit chain;
receiving radio communications signals from a plurality of other terminals using a receive chain;
transmitting a calibration signal through transmit chain to a transponder on at least two different frequency bands;
receiving a transponder signal from the transponder, the transponder signal being received on at least two different frequency bands and being based on the calibration signal; and
determining a frequency dependent calibration vector based on the at least two frequency bands of the transponder signal as received through the receive chain by comparing relative characteristics for the transponder signal at a first one of the at least two frequencies to relative characteristics for the transponder signal at a second one of the at least two frequencies.

16. The medium of claim 15, wherein determining a frequency dependent calibration vector comprises comparing relative phases for the transponder signal at a first one of the at least two frequencies to relative phases for the transponder signal at a second one of the at least two frequencies to determine a group delay.

17. The medium of claim 16, wherein the relative characteristics comprise measured phases and amplitudes of the transponder signal, wherein the instructions, when executed by the machine, cause the machine to determine an uplink signature of the transponder at the antenna array at each frequency of the transponder signal using the measured phases and amplitudes of the transponder signal and wherein the instructions, when executed by the machine, cause the machine to determine the frequency dependent calibration vector for the receive chain using the uplink signatures of the transponder.

18. The medium of claim 15, wherein the relative characteristics comprise the relative phases and amplitudes of the transponder signal as received by the receive chain.

19. The medium of claim 18 wherein determining a frequency dependent calibration vector comprises determining a receive chain group delay by comparing a phase difference between at least two receive chains for the transponder signal at a first one of the at least two frequency bands to a phase difference between the same two receive chains for the transponder signal at a second one of the at least two frequency bands.

20. The medium of claim 19, wherein one of the plurality of receive chains is selected as a reference receive chain and the group delay for each receive chain is characterized with respect to the reference receive chain.

21. The medium of claim 15, wherein the radio communication signals are adapted to conform to a code division multiple access standard.

22. A method comprising:
transmitting radio communications signal to a plurality of other terminals using a transmit chain;
receiving radio communications signals from a plurality of other terminals using a receive chain;
transmitting a calibration signal through the transmit chain to a transponder on at least two different frequency bands;
receiving a transponder signal from the transponder, the transponder signal being received on at least two different frequency bands and being based on the calibration signal; and determining a frequency dependent calibration vector based on the at least two frequency bands of the transponder signal as received through the receive chain by comparing relative characteristics for the transponder signal at a first one of the at least two frequencies to relative characteristics for the transponder signal at a second one of the at least two frequencies.

23. The method of claim 22, wherein determining a frequency dependent calibration vector comprises comparing relative phases for the transponder signal at a first one of the at least two frequencies to relative phases for the transponder signal at a second one of the at least two frequencies to determine a group delay.

24. The method of claim 22 wherein the relative characteristics comprise measured phases and amplitudes of the transponder signal, the method further comprising determining a downlink signature of the transmit chain at the transponder using measured phases and amplitudes at each frequency of the transponder signal and determining the frequency dependent calibration vector for the transmit chain using the downlink signatures of the transmit chain.

25. The method of claim 22 wherein determining a frequency dependent transmit calibration vector comprises comparing a phase difference between two transmit chains for the transponder signal at a first one of the at least two frequencies to a phase difference between the same two transmit chains for the transponder signal at a second one of the at least two frequencies to determine a group delay.

26. The method of claim 22, wherein the radio communication signals are adapted to conform to a code division multiple access standard.

* * * * *